Nov. 29, 1960 B. J. JOHANSON 2,962,686

TUBE SOCKET FOR USE WITH STANDARD GRID PATTERNS

Filed Sept. 13, 1957

Inventor
Bergt J. Johanson
John Todd
Attorney

United States Patent Office 2,962,686
Patented Nov. 29, 1960

2,962,686

TUBE SOCKET FOR USE WITH STANDARD GRID PATTERNS

Bengt J. Johanson, Des Plaines, Ill., assignor, by mesne assignments, to United-Carr Fastener Corporation, Boston, Mass., a corporation of Delaware Filed Sept. 13, 1957, Ser. No. 683,782
6 Claims. (Cl. 339—17)

Figure 1:
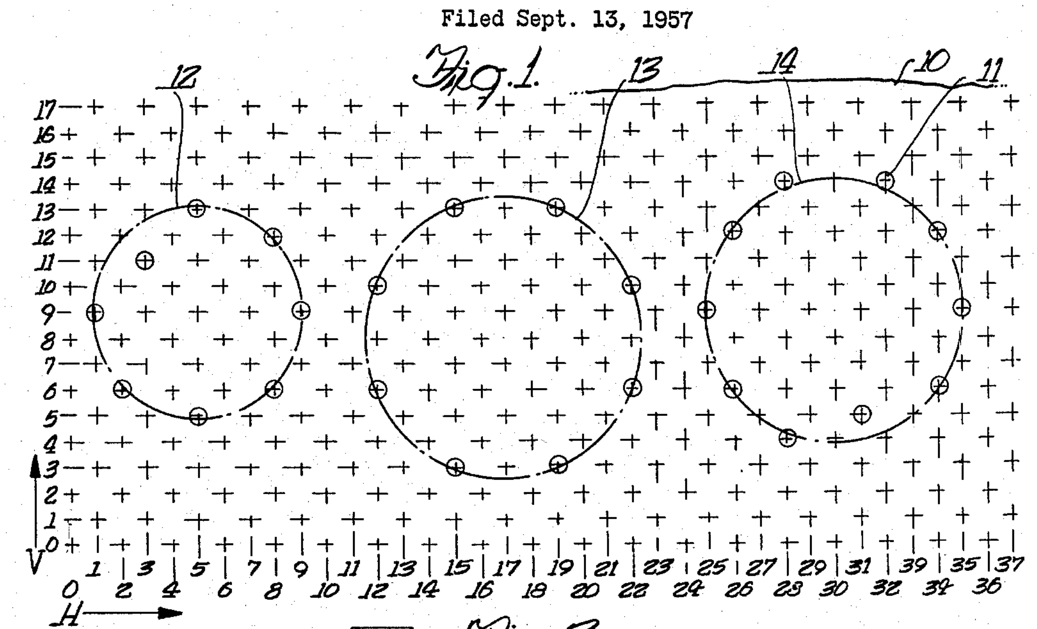

This invention relates to a tube socket, and more especially to a tube socket having particular utility in connection with mounting or support panels therefor formed from standard grid patterns.

When tube sockets are used with printed wire panels, the conventional arrangement employed for mounting the sockets thereon is to punch apertures in the panel and to insert the socket terminals therethrough. The projecting ends of the terminals are then connected to printed wires along the underside of the panel by means of solder joints, which are also effective to mechanically anchor the socket to the panel. Numerous other components, such as resistors, capacitors, inductances, etc., are mounted in the same manner, and as a consequence a multiplicity of apertures must be provided in the panels.

In many instances, a manufacturer of electronic equipment does not make the printed wire panels for his own use, but instead purchases them as completed units—that is, with the printed wires thereon and the apertures formed therein. The component orientation on a printed wire panel is carefully designed and quite precise, as it is with any other electronic equipment, and this design information must then be conveyed by the manufacturer to the panel fabricator. To simplify communication and increase the accuracy of the completed printed wire panel furnished by the supplier thereof, standard grid patterns have been developed to aid the manufacturer in that respect.

These grid patterns comprise a coordinate measuring system having its origin at the intersection of a horizontal $x$ axis and a vertical $y$ axis. The indicated distances along these axes are predetermined and depend upon the particular standard grid pattern being used. For example, one grid pattern may have horizontal coordinates measured from the origin in increments of .100 of an inch, and another grid pattern will have measuring increments of some other value. Ordinarily, the coordinates along the $y$ axis will correspond in value to those taken along the $x$ axis, but it will be apparent, the measuring increments could be different.

Where standard grid patterns are used, a printed wire panel can be ordered by simple specifying the horizontal and vertical (that is, $x$ and $y$) coordinates for each aperture that is to be punched therein. Not only does this simplify the purchasing of panels and assure accuracy therein, but it enables the supplier to employ standardized punching machinery. However, one disadvantage of consequence has arisen from the use of standard grid patterns, and it results from the limitations imposed by the rigidity of the coordinate measuring system.

To particularize this, consider the conventional 7-, 8- and 9-terminal sockets which, as is well known, have the stated number of terminals arranged along a circular arc and in spaced apart relation. Unfortunately, it has been found that all of the conventional tube sockets are not adapted for use with printed wire panels having the apertures therein formed by the coordinate measuring system, for the apertures do not properly align with the terminals of all of the sockets. It would be an important contribution to the art to overcome this problem in a simple manner, and accordingly, it is an object of this invention to provide sockets that can be employed with panels made from a standard pattern.

Another object of the invention is in the provision of tube sockets that may be used with such panels, and which necessitate but a minimum change from the conventional sockets now in use. Still another object is that of providing a socket that employs for the most part a conventional casting and pins or terminals therefor, but which is uniquely modified to tailor it to standard grid patterns.

Yet a further object is to provide a tube socket in which certain of the terminal openings are canted or twisted slightly to define an angular orientation with radii of the socket casting. Yet a further object is to provide a tube socket of the character described, in which the tails of certain of the pins or terminals are flared outwardly, and others inwardly, for alignment with the apertures therefor in a printed wire panel. Additional objects and advantages will become apparent as the specification develops.

An embodiment of the invention is illustrated in the accompanying drawings, in which—

Figures 2, 3, 4, 5:
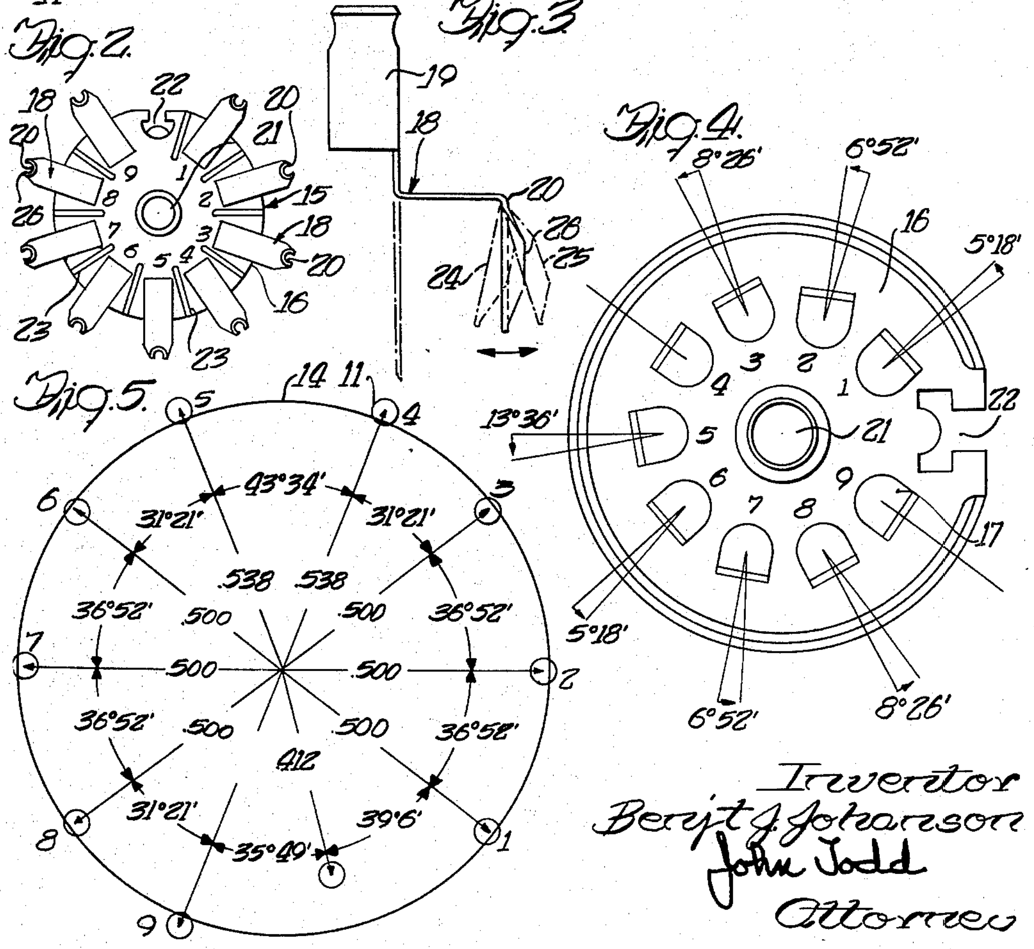

Figure 1 is a top plan view of a printed wire panel with a standard grid pattern superimposed thereon; Figure 2 is a bottom plan view of a 9-pin tube socket; Figure 3 is a side view in elevation of a terminal or pin used in the socket of Figure 2; Figure 4 is an enlarged view in top plan of the socket casting shown in Figure 2; and Figure 5 is an enlarged diagrammatic view showing the radial distance of the apertures formed in the panel of Figure 1 as measured from the center of the tube socket illustrated in Figure 2.

A printed wire panel is shown in Figure 1, and is designated with the numeral 10. The panel 10 has a standard grid pattern superimposed thereon which is based on a horizontal or $x$ axis and a vertical or $y$ axis, designated respectively in Figure 1 with the arrows denoted H and V. The measuring increments along the horizontal axis are designated 0 through 37, and those along the vertical axis 0 through 17. As is conventional, the origin is at the intersection of the H and V axes, or at the H–0, V–0 coordinates. As heretofore stated, the measuring increments along both the axes may vary and will depend upon the measuring standard employed.

In the specific illustration, these increments are multiples of .100 of an inch along both of the axes. To use the system in locating and punching holes or apertures (which usually are round) in the panel 10, it is only necessary to locate each aperture by the H and V coordinates. Take, for example, the aperture 11. It is located at H–32, V–14. The panel 10, and grid system shown therewith, has illustrated thereon the aperture arrangement which would be employed with 7-, 8- and 9-pin sockets—such illustrations being the circular arcs indicated respectively by the numerals 12, 13 and 14.

The details of a novel or 9-pin tube socket for use with the panel 10 are shown in Figure 2, and in that figure the socket in its entirety is identified with the numeral 15. The socket 15 comprises a casting 16, shown in Figure 4 to have nine pin or terminal-receiving openings 17 therein. For identification, these openings are numbered on the casting as 1 through 9, inclusive. Mounted within each of these openings is a terminal 18, shown in Figure 3 to have a generally tubular body 19 received within the various openings 17, and a tail 20 that depends from the bottom side of the casting 16.

The casting 16 also has a center opening or passage 21 therethrough adapted to receive a ground pin (not shown), and along one side thereof the casting is notched or recessed as at 22 for receiving a ground clip (not shown) which will be electrically connected at one end to such ground pin, and at its other end with a tube shield. Also, a depending rib 23 formed integrally with the casting 16 is positioned between each of the terminals 18.

If reference is made to Figure 4, it will be noted that certain of the pin-receiving openings are twisted or canted with respect to radii of the casting 16 which extend therethrough. More particularly, openings 4 and 9 are in precise alignment with the radii therethrough, but all of the remaining openings are twisted. Thus, openings 1 and 6 are twisted in a counter-clockwise direction, and a line drawn therethrough forms an angle of slightly over 5° with the radii of the casting. Openings 2 and 7 are also twisted in a counter-clockwise direction, and a center line therethrough forms an angle of slightly less than 7° with the casting radii. Openings 3 and 8 are similarly twisted in a counter-clockwise direction, and form angles of about 8½°; while opening 5 is twisted in a counter-clockwise direction to an angle of about 13½°. It may be noted that all of the openings with the exception of #5 are arranged in diametrically opposed pairs so that the various radii referred to comprise diameters of the casting 16.

As a result of this twisting or slight rotation of the various pin-receiving openings 17, the tails 20 of the respective pins or terminals 18 will be offset from diameters of the casting 16 by the angular amounts designated, and a close inspection of Figure 2 will reveal this. These tails, if normal to the undersurface of the casting 16, would not all align with the openings 11 provided therefor in the panel 10. This will be evident by referring to Figure 5, which shows the radial distance of the apertures 11 from the center of the casting 16. In this figure, the circular arc corresponds to the arc 14 shown in Figure 1 and is, therefore, identified with that numeral. This arc is drawn substantially through the center of the generally semi-cylindrical contact tails 20, and it is evident that certain of the apertures 11 are exterior of the arc, while other of the apertures are interiorly thereof. In Figure 5 the diagrammatic apertures 11 are denoted, respectively, with the numerals 1 through 9 since they correspond to the identically numbered apertures in the casting 16. Thus, the apertures 1, 2, 3, 6, 7 and 8 lie within the interior of the circular arc, while apertures 4, 5 and 9 are external thereof.

In order to align the respective tails 20 of the terminals 18 with the apertures and thereby assure insertion of the tails therethrough, the tails 20 of the terminals positioned within the openings 1, 2, 3, 6, 7 and 8 are angled inwardly, as shown by the dotted lines 24 in Figure 3, and the tails of the terminals 4, 5 and 9 are angled outwardly, as shown by the dotted lines 25 in that view. The angular orientation of the tails 20 is such that it aligns them with the apertures 11 in the panel 10, and is in the order of about 2°. To further aid in inserting the tails into the apertures therefor, each tail at the end thereof can be rounded slightly to form side walls or ears 26.

Tube sockets having the characteristics heretofore described have been found to be readily usable with printed wire panels having the terminal-receiving apertures therein located by means of standard grid patterns. All of the terminals properly align in an angular sense with the apertures in the panel because of the slight rotations of certain of the pin-receiving openings in the socket casting or body 16. Also, the terminals align in a vertical sense, or in a direction normal to the plane of the panel 10 because of the angular positioning (that is, the outward or inward toeing) of the terminal tails 20.

It will be noted in the novel socket (as shown best in Figure 4) that all of the openings 17 with the exception of #5 are arranged in pairs, and that each of the openings has a flat side against which the upper portion of the tail 20 is positioned when the terminals are within the openings. The centers of the openings 17 lie on diameters of the casting 16; and when the openings are rotated or twisted slightly, the flat sides thereof form angles of less than 90° with such diameters.

Thus, the terminal openings 3 and 8 in Figure 4 have the flat sides thereof forming an angle of about 91½° with the diameter that extends through the centers of those paired openings. At the same time, of course, the angle formed by such diameter with lines drawn normal to the flat sides is about 8½°. The tails 20 of the terminals may be toed in or out as necessary during the assembly operation in which the terminals are inserted into the openings 17 therefor, and have their tails bent laterally and then downwardly into the configurations shown in Figures 2 and 3. It will be noted by referring to Figure 5 that the tails of the paired terminals—that is, the terminals that are positioned within the diametrically opposite openings—have their tails toed or angled in the same direction. More specifically then, the terminals comprising the following pairs 1—6, 2—7 and 3—8 have the tails thereof toed inwardly, while the pair 4—9 has the tails thereof toed outwardly. Also, the terminal within the opening 5 has its tail toed outwardly.

While in the foregoing specification an embodiment of the invention has been described in considerable detail for purposes of making an adequate disclosure thereof, it will be apparent that those skilled in the art may make numerous changes therein without departing from the spirit and principles of the invention.

I claim:

1. A tube socket adapted for use with a conductor-equipped panel having a plurality of terminal-receiving apertures therethrough respectively located by means of the coordinants of a standard grid pattern whereby all of such apertures are not spaced from each other by equal arcuate distances, comprising a socket body having a plurality of terminal-receiving openings therein describing a circle having its origin substantially at the center of the socket body and substantially all of said openings being angularly spaced from those adjacent thereto by equal intervals whereby a plurality of radial lines respectively drawn from such origin through the centers of said openings will not all extend through the centers of the corresponding apertures in such conductor-equipped panel when said socket body is properly positioned thereon, and a plurality of terminals respectively mounted within said openings and each of said terminals being equipped with a tail displaced from the associated opening and the circle described by said openings, a substantial number of said tails being angularly offset from such radial lines extending through the respectively associated openings and the amount of such angular offsets varying from terminal to terminal so as to effect a condition of substantial alignment of said tails with the respective apertures in such panel when the socket body is properly positioned thereon so as to enable said tails to be respectively inserted into such apertures.

2. The socket of claim 1 in which a number of said openings are arranged in diametrically opposite pairs, and in which the angular dispositions of the tails of the contacts mounted in any one of such pairs have substantially the same angular disposition.

3. The socket of claim 1 in which all of said offset tails are offset in the same angular direction.

4. The socket of claim 1 in which all of such apertures describe a circle and lie on the circumference thereof, and in which said tails also describe a circle and all lie on the circumference thereof, such circles being superimposed when said socket body is properly positioned on such panel.

5. The socket of claim 1 in which certain of such apertures define a circle but in which all of the apertures do not lie on the circumference of such circle, and in which certain of the tails of said contacts are toed inwardly and others outwardly so as to respectively align with such apertures when said socket is properly positioned upon said panel.

6. The socket of claim 1 in which each of said openings is provided with a generally flat wall portion, and in which a substantial number of said openings are rotated slightly about the centers thereof to effect the aforesaid angular displacement of said tails.

References Cited in the file of this patent

UNITED STATES PATENTS

| | | |
|---|---|---|
| 2,259,738 | Del Camp | Oct. 21, 1941 |
| 2,269,993 | Schmitt | Jan. 13, 1942 |
| 2,807,790 | Del Camp | Sept. 24, 1957 |
| 2,857,582 | Wintress | Oct. 21, 1958 |
| 2,858,519 | Johanson et al. | Oct. 28, 1958 |